United States Patent [19]
Gottlieb et al.

[11] Patent Number: 5,638,434
[45] Date of Patent: Jun. 10, 1997

[54] CONFERENCE SYSTEM FOR DIAL-OUT TELEPHONE CALLS

[75] Inventors: Louis G. Gottlieb, Colorado Springs, Colo.; Arunachalam Venkatraman, Cedar Rapids, Iowa

[73] Assignee: MCI Corporation, Washington, D.C.

[21] Appl. No.: 521,437

[22] Filed: Aug. 30, 1995

[51] Int. Cl.⁶ .............................. H04M 3/42; H04M 1/00; H04M 7/00; H04Q 11/04
[52] U.S. Cl. .......................... 379/203; 370/260; 379/158; 379/216; 379/219
[58] Field of Search .............................. 370/62; 379/158, 379/202, 203, 204, 205, 206, 201, 207, 219, 220, 216

[56] References Cited

U.S. PATENT DOCUMENTS

| | | | |
|---|---|---|---|
| 4,796,293 | 1/1989 | Blinken et al. | 379/202 |
| 5,408,526 | 4/1995 | McFarland et al. | 379/202 |
| 5,483,587 | 1/1996 | Hogan et al. | 379/202 |

*Primary Examiner*—Krista M. Zele
*Assistant Examiner*—Harry S. Hong

[57] ABSTRACT

A conference system provides dial-out conference calls to participants who use various virtual private network dialing plans as well as place non-plan calls, such as Direct Distance Dialing and International Direct Distance Dialing. The conference system recognizes non-identical VPN dialing plans, as well as PSTN numbers, which all originate on a single Dedicated Access Line (DAL). When a dial-out conference call is originated on a DAL, a switch performs a database query to determine a VPN dialing plan. Based on a code provided along with the dialed telephone number, the database identifies the number as belonging to a particular VPN dialing plan and translates it into a physical termination. Alternatively, if the code indicates that the number does not belong to a VPN dialing plan, i.e., a DDD or IDDD number, it is unmodified by the database. Either translated or untranslated number is then returned to the switch for subsequent network routing to a physical termination.

8 Claims, 3 Drawing Sheets

CONFERENCE SYSTEM FOR DIAL-OUT TELEPHONE CALLS

FIELD OF THE INVENTION

This invention relates to telephonic communications systems and in particular, a system for providing a dial-out telephone conference among customers who use various private dialing plans, as well as place non-plan calls.

BACKGROUND OF THE INVENTION

A telephone conference allows multiple parties, i.e., conferees or conference participants (both terms used interchangeably), to transmit audio, video, digital data or a combination of the data types to each other. This form of conference replaces a "traditional" in-person conference requiring the participants to be present in the same location.

Typically, a conference leader contacts a telecommunications service provider and reserves a conference bridge, which is a microprocessor-controlled device for interconnecting callers. This process entails reserving a certain number of telephone lines, i.e., ports, on the conference bridge at a specific date and time. The conference leader then provides an access number, such as a 1-800 number for example, to each conference participant. At the time of the conference call, each conferee dials the access number and, perhaps, an access code or a password used as an option for security reasons. Using this procedure, each conferee is connected to the same conference bridge for participating in the scheduled conference. The calls in this type of conference are known in the art as dial-in or meet-me calls.

Telecommunications service providers may also offer a dial-out conference service. This service is similar to the dial-in conference calling, which also requires a conference leader to reserve a conference bridge in advance. In contrast to dial-in calls, rather than having each conferee call into the conference bridge using a single access number and an optional access code, an operator dials each participant's telephone number at the scheduled time of the conference to connect them to the conference bridge. The operator "dials out" of the bridge using each conferee's telephone number given by the conference leader during the reservation process. When the conference participant answers the operator's call, he is connected to the conference bridge and joins the conference with other participants.

When initially offered, a dial-out conference call was only available to conferees who used telephone numbers on a standard Public Switched Telephone Network (PSTN), such as Direct Distance Dialing (DDD) or International Direct Distance Dialing (IDDD). In order for a participant to be bridged into a conference call, a conference leader had to provide a 10-digit PSTN number of that participant to the operator.

As an alternative to the above traditional type of call, a virtual private network (VPN) or virtual dialing plan (both terms used interchangeably) grew in popularity, because it allowed customers to tailor networks to their specific communications needs without the necessity of installing fixed point-to-point private lines such as Dedicated Access Lines (DALs). Similar to Private Branch Exchange (PBX), a VPN allows easy intracompany access on a more global scale than a PBX. Using a VPN which is implemented via software techniques, a multi-location customer sets up a private dialing plan on an interexchange carrier network (IXC) using only a few digits (typically from 4 to 7) to easily dial geographically scattered locations. Advantages of VPN over a DDD/IDDD number created a need to offer dial-out conference service using Virtual Private Network numbers.

To meet this need, telecommunications service providers had to install Dedicated Access Lines for connecting a conference bridge to a switching office (switch). This implementation enabled an operator to dial-out conferees' VPN numbers and connect them to the conference bridge. In order to do this, the switch must recognize the conferee's VPN dialing plan for properly routing the call. The identification of a VPN dialing plan is based on the DAL trunk group from which the dialed-out call is originated by an operator. A separate DAL is, therefore, needed to identify each customer to the switch. This requires, for example, 100 DALs for connecting a conference bridge to a switch in order to serve 100 customers. The advantages of a VPN are, therefore, immensely offset by the expense in the additional network resources.

Furthermore, due to the current business environment in which several companies are working together on joint business ventures, participants from different companies using different VPN dialing plans would like to conduct a dial-out telephone conference. This type of conference would not have all call legs on the identical VPN dialing plan. It is extremely difficult for an operator to dial-out conferees on various VPN dialing plans, because the operator must dial-out each participant on a separate DAL trunk group, or use a burdensome calling card method.

A need, therefore, exists for a conference system to establish, utilizing a single DAL trunk group, a dial-out telephone conference with conference participants who do not use the same dialing plan.

SUMMARY OF THE INVENTION

It is therefore an object of the invention to provide a system for establishing a dial-out conference with non-identical types of a call leg.

It is another object of the invention to provide a system for establishing a dial-out conference with non-identical types of a call leg using a single DAL.

It is yet another object of the invention to provide a system for establishing a dial-out conference with non-identical types of a call leg without additional installation of DALs or other private lines.

These and other objects, features and advantages are accomplished by the present invention of a conference system which originates dial-out telephone calls of different virtual private plans as well as non-plans. The conference system comprises a reservation system for accepting a customer reservation for a conference. The reservation system includes means for generating an electronic file to input information from the customer reservation and means for accessing a first table to generate a code which identifies the conference and a call leg type within the conference.

In accordance with the present invention, the conference system comprises a conference bridge, which is responsive to the reservation system, for connecting a call leg of the conference with the remaining call legs to provide communication among conferees. Also included is a bridging switch, which is responsive to the conference bridge, for routing the call leg to a terminating location.

Further in accordance with the present invention, a database, responsive to the bridging switch, translates the code to a physical termination number based on the call leg type. The database comprises means for accessing a second table to provide the physical termination number based on the code which represents a customer's telephone call using either a virtual private plan or DDD/IDDD.

BRIEF DESCRIPTION OF THE DRAWINGS

The above-mentioned advantages of the present invention will be more clearly understood when considered in conjunction with the accompanying drawings, in which.

In all Figures, like reference numerals represent same or identical components of the present invention.

DESCRIPTION OF THE PREFERRED EMBODIMENTS

Figure 1:
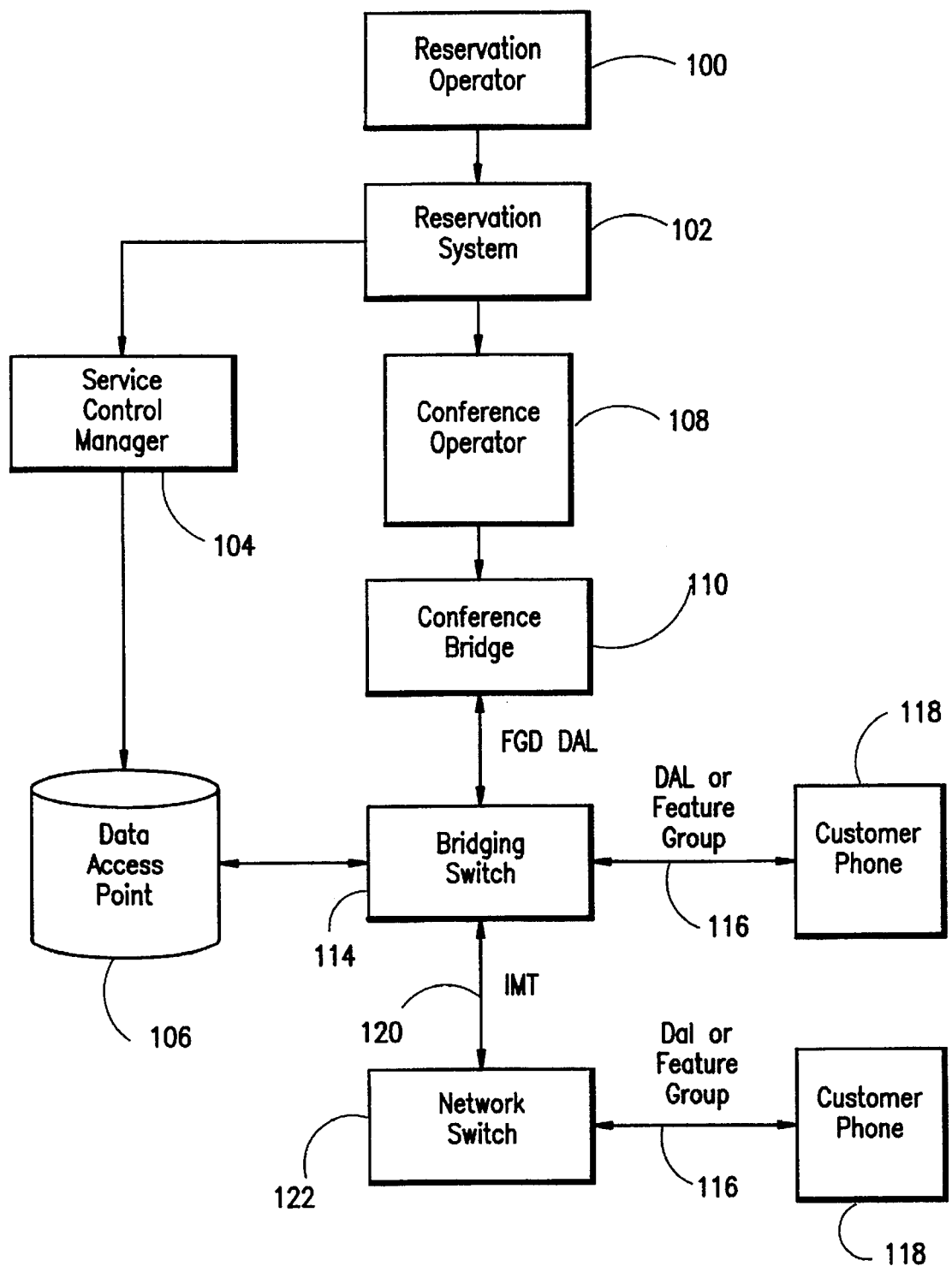
FIG. 1 shows a block diagram of a network architecture for a dial-out conference in accordance with one embodiment of the present invention.

Referring to FIG. 1, a block diagram of a network architecture for a dial-out conference is shown in accordance with one embodiment of the present invention.

Prior to a dial-out conference, a leader makes a conference reservation by contacting a telecommunications service provider. The leader contacts a reservation operator 100 who schedules and reserves a conference bridge 110 based on the leader's requirements. The following information is typically requested by the reservation operator 100 to schedule a conference:

Customer's Name

Date of Call

Start Time

Estimated Duration

Names and Telephone Numbers for Participants

Virtual dialing plan used by each participant

Requested Features (taping, translation, etc.)

The reservation operator 100 enters the above data into an application program running on a computer in a reservation system 102 which is an order entry system. Based on the information, the reservation system 102 creates a reference file for the conference. Among the various fields in the reference file holding the information supplied by the leader, one field includes information generated by the reservation system 102 itself. This field — called a supplementary code field in one embodiment of the invention — comprises two numbers: a conference I.D. and a customer I.D.

Thus, the reservation system 102 assigns identifiers associated with each conference and each call leg of the conference. The identifier for the conference may be assigned randomly or in sequential order, while the identifier for each call leg of the conference is based on either the VPN or DDD/IDDD used by the conferee. For example, a table located in the reservation system 102 is used to look up a code corresponding to the type of call leg in the conference. Based on the information provided by the conference leader, the reservation system 102 matches a code with the conferee's type of call.

In one embodiment of the present invention, the two identifiers located in the supplementary code field of a call record form an 11-digit code conceptually divided into two I.D. numbers. The first 4 digits of the supplementary code field comprise the customer I.D. number. Different combinations of the 4-digit code identify either the VPN dialing plan or DDD/IDDD telephone numbers used by conferees.

For example, a representative from company A, having three geographically scattered locations, schedules a dial-out conference with a company B, having six locations in the U.S., and company C with only one location. Company A uses private dialing plan 1, company B uses private dialing plan 2, and company C does not have a private dialing plan. Based on this information provided by company A's representative, the reservation system 102 accesses a table to determine a 4-digit code, for example, corresponding to the companies scheduled to participate in the conference. Thus, code 2486 may be a code for the private dialing plan 1, code 3594 for plan 2, and code 0000 for non-plan call.

The remaining 7 digits in the 11-digit code field comprise a conference I.D. which identifies the conference for various network purposes, such as billing for example. All call legs pertaining to a particular conference are tagged with the same 7-digit conference I.D.

Figure 2:
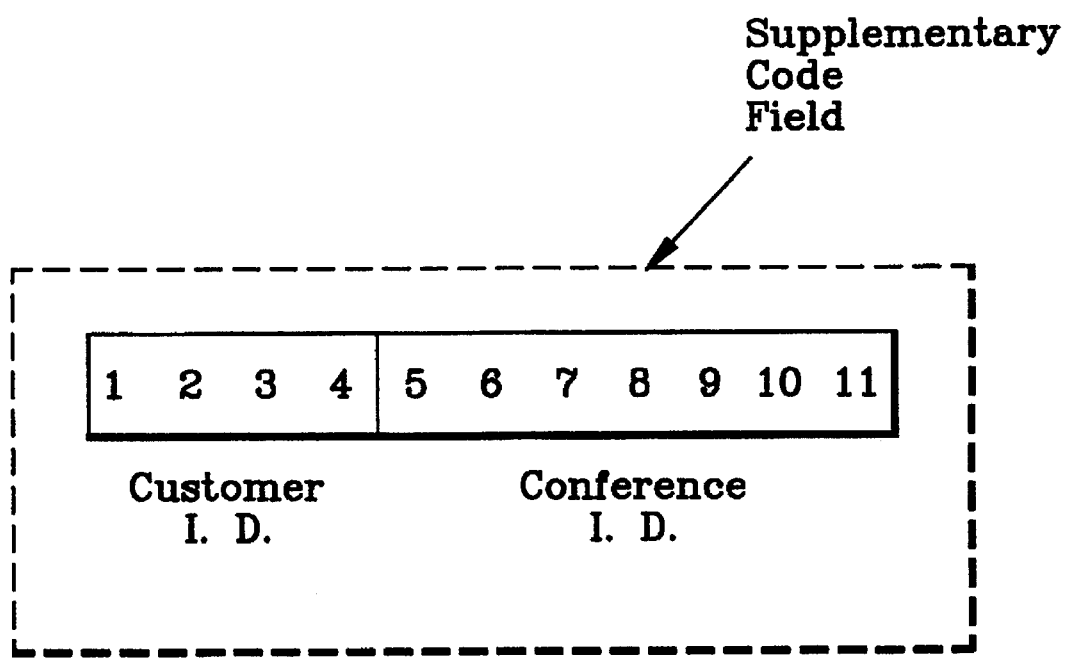
FIG. 2 shows a supplementary code field in a record in accordance with one embodiment of the present invention.

With reference to FIG. 2, the supplementary code field in a record is shown in accordance with one embodiment of the invention, having the following information for a dial-out conference call. The first 4 digits of the supplementary code (positions 1-4) include the customer I.D. for identifying the dialing plan for routing. For non-VPN calls, which do not require VPN translation, the customer I.D. may be 0000 occupying the first 4 digits. The last 7 digits of the supplementary code field (positions 5-11) denote the conference I.D.

Referring again to FIG. 1, as part of the customer setup which is prior to the conference leader calling the reservation operator 100 to schedule a conference, a Data Access Point (DAP) 106 is supplied with a table mapping customers I.D. to private dialing plans subscribed by the customers. Thus, the DAP 106 is a database which includes customers' VPN dialing plans and comprises a table for translating a VPN number to a physical termination code (number) based on a 4-digit customer I.D. code which uniquely identifies the customer's VPN dialing plan. As a result, each customer I.D. is associated with a particular VPN dialing plan in the DAP 106.

Although in the preferred embodiment, the mapping table is downloaded to the DAP 106 from the reservation system 102, the present invention is certainly not limited to this particular embodiment and other means may be used for providing the mapping table to the DAP 106. A Service Control Manager (SCM) 104 facilitates the downloading process among several redundant DAPs, again according to this particular embodiment of the present invention.

With reference to FIG. 1, the reservation system 102 provides a report to a conference operator 108. Among other things, this report comprises each participant's telephone number (VPN, DDD, or IDDD) and a supplementary code field. The conference operator 108 is equipped with a workstation and an autodialer. Based on the report received from the reservation system 102, the conference operator 108 programs the autodialer with a telephone number, i.e., VPN, DDD, or IDDD, and a supplementary code field for each participant. At the scheduled time of the conference, the conference operator 108 calls participants one by one. The conference call is established via the autodialer dialing the participant's telephone number.

The call is originated on a FG-D DAL 112 by the conference bridge 110 which was previously allocated and configured in accordance with the conference reservation information. As explained earlier, the conference bridge 110 permits conferees from several locations to be connected together for a conference call. As known in the art, the conference bridge 110 includes means for amplifying and balancing data. The conference bridge 110 is connected to the bridging switch 114 which serves as an originating switch for the conference bridge 110. The bridging switch 114 has a data link to the DAP 106 for network routing of data transaction queries.

Subsequent to an off-hook signal from the conference bridge 110 indicating a call origination, the bridging switch 114 receives the VPN, DDD, or IDDD number. The originating trunk group FG-D DAL 112 is designated as a Vnet® DAL in a table located in the bridging switch 114, and based on this designation the bridging switch 114 launches a query to the DAP 106. As part of the query, the DAP 106 is provided with the dialed number and originating trunk group.

Since the call originates via the Vnet® DAL which is marked for shared origination in the DAP's database table, the DAP 106 recognizes the call as a shared Vnet® origination call. The DAP 106 then instructs the bridging switch 114 to play a bong tone and solicit supplementary codes from the conference operator 108. The conference operator 108 then sends to the bridging switch 114 — via an autodialer or manual dialing — the 11-digit supplementary code for that participant. The bridging switch 114 passes the supplementary code to the DAP 106.

As previously stated, the DAP 106 associates the 4-digit customer I.D. portion of the supplementary code with either a particular VPN dialing plan or DDD/IDDD number. If the customer I.D. code indicates that the conferee is using a VPN dialing plan, the DAP 106 will translate the dialed number to a physical termination code based on the associated dialing plan. The DAP 106 will return this physical termination code to the bridging switch 114 for subsequent network routing. If, however, the customer I.D. code indicates that the dialed number is a DDD or IDDD number, the DAP 106 will return the untranslated dialed number to the bridging switch 114 for subsequent network routing.

In either case, the bridging switch 114 will receive the physical termination code and route the call to the proper termination, which is either directly connected with the bridging switch 114 or located off another network switch 122. An Inter-Machine Trunk (IMT) 120 will connect the bridging switch 114 with the network switch 122 if other network switches are used for connection with a terminating location. The physical termination represents a customer's phone 118, which may be connected to the network by a DAL or a shared Feature Group line 116 provided by a Local Exchange Carrier (LEC), as well known by a person skilled in the art.

If the customer answers the call, the conference bridge 110 will receive a call-answered message from the network. The conference bridge 110 will then connect the customer with the other participants of the conference.

Figure 3:
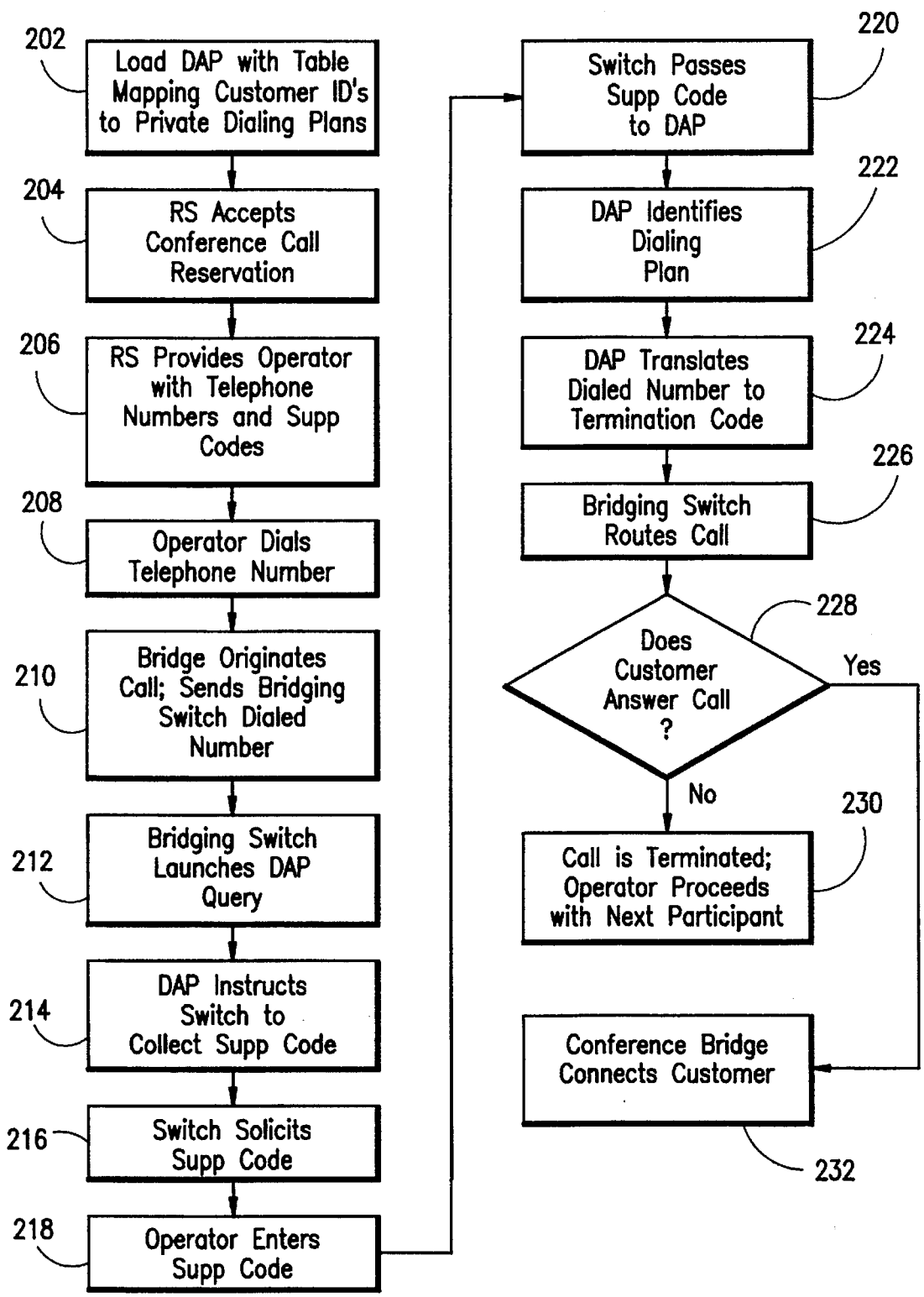
FIG. 3 shows a flowchart of an operation of the block diagram of FIG. 1 in accordance with one embodiment of the present invention.

FIG. 3 shows a flowchart of an operation of the block diagram of FIG. 1 in accordance with one embodiment of the present invention. In step 202, prior to the conference leader calling the reservation operator 100 to schedule a conference, the DAP 106 is supplied with a table mapping customers I.D. to private dialing plans subscribed by the customers. The DAP 106 can then use the customer I.D. (the last 4 digits of the supplementary code in the preferred embodiment) to identify the dialing plan for that participant. In step 204, the reservation system 102 accepts a reservation for a conference call from a customer or a customer service representative. Among other information supplied by a conference leader and placed into the reservation file, an 11-digit supplementary code for each participant will be provided by the reservation system 102. As previously stated, the conference I.D. code may be assigned randomly or in sequential order, while the company I.D. code, based on either the VPN or DDD/IDDD used by the conferee, is determined from a look up table in the reservation system 102. The reservation system 102 also provides each participant's telephone number and the supplementary code to the conference operator 108 as shown in step 206, who will then program these numbers into an autodialer.

At the time of the conference call, the conference operator 108 will dial the telephone number of each participant as shown in step 208. Step 210 shows the conference bridge 110, which is directly accessed by the conference operator 108, originating the call to a conferee and sending the dialed number to the bridging switch 114.

The bridging switch 114, recognizing that the call is originating on a shared FG-D DAL 112, launches a query to the DAP 106 to solicit call routing instructions, as shown in step 212. In step 214, the DAP 106 recognizes this call as a dial-out conference call and instructs the bridging switch 114 to collect a supplementary code. The bridging switch 114 plays a bong tone for the conference operator 108, soliciting an 11-digit supplementary code according to step 216. In step 218, the conference operator 108 enters a supplementary code, which the bridging switch 114 then passes to the DAP 106 in step 220.

The DAP 106 selects the 4-digit customer I.D. from the supplementary code, as shown in step 222, and identifies the proper VPN dialing plan using a translation table, if applicable, in step 224. If the dialed number represents a DDD or IDDD telephone number, a customer I.D. code, such as 0000 for example, is used to denote that no translation is required. If the dialed number is a VPN number, the DAP 106 translates it to a physical termination code and sends that code to the bridging switch in step 224. If the dialed number is a DDD or IDDD number, the DAP 106 returns the untranslated DDD or IDDD number to the bridging switch 114. In step 226, the bridging switch 114 then routes the call over the network based on the response it receives from the DAP 106.

If, in step 228, the customer does not answer the call, it is terminated, and the conference operator 108 proceeds to dial the next participant as shown in step 230. In the alternative, if the customer answers the call, that customer is connected to the conference bridge 110 to join other conferees in step 232.

The specifications in the above description should not be construed as limitations on the scope of the invention, but rather as specifications of the preferred embodiment. Other variations and modifications are possible, and will occur to persons skilled in the art.

For example, although the preferred embodiment describes a remotely located database within the DAP 106, the database for number translation may be co-located with the bridging switch 114. Furthermore, the size and format of the supplementary code may vary to fit specific identification schemes. In addition, 1-800 numbers may be used to access customers' telephones, as well as VPN, DDD, and IDDD numbers which were described in a particular embodiment of the invention.

Although, the preferred embodiment of the present invention describes the conference system for dial-out telephone calls, other uses of shared origination are feasible for private dialing plans. In another embodiment of the present invention, for example, a message delivery system uses virtual private dialing plans instead of PSTN network. In the message delivery system, a customer calls an Audio Response Unit (ARU) to leave a message for a called party, and the ARU periodically dials the called party until there is an answer. Since the customer, i.e., the calling party, is charged for the time and number of retries, significant amount of money can be saved by the customer if a private dialing plan is used to reach the termination point (called party).

In yet another embodiment of the present invention, a facsimile store and forward system also utilizes virtual private dialing plans instead of the PSTN network. For example, a customer transmits a fax and a list of telephone numbers to a centralized system requesting that the fax be forwarded to those numbers. Again, the customer can save significant amount of money if a private dialing plan is used to transmit the fax to the telephone numbers on the list.

Since those skilled in the art can modify the disclosed specific embodiment without departing from the spirit of the invention, it is, therefore, intended that the claims be interpreted to cover such modifications and equivalents.

What is claimed is:

1. A conference system for originating dial-out telephone calls of different virtual private plans and non-plans, comprising:

a reservation system for accepting a customer reservation for a conference, said reservation system including means for generating an electronic file to input information from said customer reservation and means for accessing a table to generate a code based upon a call leg type of said conference;

a conference bridge responsive to said reservation system for connecting a call leg of said conference with the remaining call legs to provide communication among conferees;

a bridging switch responsive to said conference bridge for routing said call leg to a terminating location; and a database responsive to said bridging switch for translating said code to a physical termination number based on said call leg type.

2. The system according to claim 1, wherein said database comprises means for accessing another table to provide said physical termination number based on said code, wherein said code represents a customer's telephone call using a virtual private plan.

3. The system according to claim 1, wherein said database comprises means for accessing another table to provide said physical termination number based on said code, wherein said code represents a customer's telephone call not using a virtual private plan.

4. The system according to claim 1, further comprising a network switch connected to said bridging switch for routing said call leg to said terminating location.

5. The system according to claim 1, wherein said database is co-located with said bridging switch.

6. A method of originating dial-out telephone calls of different virtual private plans and non-plans in a conference, comprising:

accepting a customer reservation for said conference;

providing an electronic file to input information from said customer reservation;

accessing a table to generate a code based upon a call leg type of said conference;

forwarding said code to a database for translation;

translating said code representing said call leg type to a physical termination number; and routing a call leg to a terminating location based on said physical termination.

7. The method according to claim 6, wherein said generating comprises accessing a table and obtaining said physical termination number based on a code, wherein said code represents a customer's telephone call using a virtual private plan.

8. The method according to claim 6, wherein said generating comprises accessing a table and obtaining said physical termination number based on a code, wherein said code represents a customer's telephone call not using a virtual private plan.

* * * * *